United States Patent [19]

Neuberger et al.

[11] Patent Number: 5,790,724

[45] Date of Patent: Aug. 4, 1998

[54] 16 µM INFRARED REGION BY DESTRUCTION OF SPECKLE PATTERNS

[75] Inventors: Wolfgang Neuberger, Monchen-Gladbach, Germany; Vjacheslav Artjushenko, Moscow, Russian Federation

[73] Assignee: CeramOptec Industries Inc., East Longmeadow, Mass.

[21] Appl. No.: 721,459

[22] Filed: Sep. 27, 1996

Related U.S. Application Data

[63] Continuation of Ser. No. 435,196, May 5, 1995, abandoned.
[51] Int. Cl.[6] .................................... G02B 6/26; G02B 6/42
[52] U.S. Cl. ........................................ 385/31; 250/227.14
[58] Field of Search ................................. 385/24, 31, 29; 250/227.14, 227.16, 227.19

[56] References Cited

U.S. PATENT DOCUMENTS 5,212,379  5/1993  Nafarrate et al. .................. 250/227.14
5,291,013  3/1994  Nafarrate et al. .................. 250/227.14

*Primary Examiner*—Akm E. Ullah
*Attorney, Agent, or Firm*—Bolesh J. Skutnik; BJ Associates

[57] ABSTRACT

High power transmission in the 2.6 µm to 16 µm infrared region is hampered by damage to the ends of the optical fiber, especially the delivery end, which greatly limits the delivery capacity of the optical fiber. The threshold for damage experienced by the ends of an optical fiber, particularly at the delivery end, is raised by destroying the naturally formed speckle pattern present in a normal fiber optic laser delivery system. The speckle pattern is destroyed by vibrating the laser, the receiving end of the optical fiber, or an optical element along the transmission path. The system comprises a laser source for infrared emissions, an optical fiber capable of transmitting said wavelengths, and a vibratory device such as an ultrasonic transducer. The vibratory device is used to vibrate the laser, the optical fiber, or another optical component in the transmission path. This system not only transmits higher power densities in the infrared region but also delivers the power more evenly distributed power.

4 Claims, 2 Drawing Sheets

16 μM INFRARED REGION BY DESTRUCTION OF SPECKLE PATTERNS

This application is continuation of application Ser. No. 08/435,196 filed on May 5, 1995 which is now abandoned.

BACKGROUND OF THE INVENTION

1. Field of the Invention

The present invention relates to enhanced transmission of high power densities from lasers emitting in the infrared range through optical fibers. In particular this is accomplished by raising the optical fiber's damage threshold value at both its input end and at its output end.

2. Invention Disclosure Statement

High power densities can be transmitted using optical fibers with certain wavelengths of laser emissions. For example, it is possible to transmit in the range of 10 Gigawatts per $cm^2$ (10 $GW/cm^2$) of pulsed power from Nd: YAG lasers having 1.064 μm wavelength using fused silica glass optical fibers. In comparison a maximum of only about 10 $W/cm^2$ of infrared-range emissions (wavelengths between 2.6 μm and 16 μm) may be transmitted using a compatible optical fiber. For example, a delivery system having a $CO_2$ laser emitting CW light at 10.6 μm and silver-halide optical fiber can deliver a maximum of approximately 10 $W/cm^2$.

The current maximum transmittable power density value is considerably lower than the theoretical internal damage threshold of the optical fiber. This appears to be due to the existence of "hot spots" arising from a speckle pattern present in a typical laser's output. The "hot spots" of speckle patterns represent uneven distributions of power, being localized points of relatively high power densities that damage the optical fiber's ends. Such irregular patterns are also seen in the output of the optical fiber. The output end of optical fibers has been experimentally shown to sustain significantly more damage than the input end for a given delivered power density. This can be due to refocussing, beam distortion, and reflections at the fiber/air interface that occur within the optical fiber.

OBJECTS AND SUMMARY OF THE INVENTION

An object of the present invention is to increase the level of transmittable power density of laser emissions having wavelengths between 2.6 μm and 16 μm in optical fibers.

A further object of the present invention is to reduce the existence of hot spots arising from a speckle pattern in the transmitted beam, thereby reducing end damage to optical fibers during transmission.

Still a further object of the present invention is to deliver an evenly dispersed pattern of power density.

Briefly stated, the present invention is a system for the transmission of high infrared power densities and for the delivery of evenly distributed power densities through a single optical fiber. This is accomplished by rapidly vibrating either the laser source relative to the optical fiber's receiving end, by rapidly vibrating the receiving end of the optical fiber itself relative to the laser source, or by vibrating another optical element within the transmission's path. A useful rate of vibration in the direction perpendicular to the fiber axis is achieved using ultrasonic transducers attached to the laser, the optical fiber's receiving end, or an optical element. The optical element may be an intermediate focussing lens or similar optical component.

These methods reduce damage to the optical fiber's ends, particularly the output end, at every power level. This allows an increase in the level of transmittable power.

The same methods also yield a smooth distribution of power at the output end of the optical fiber, increasing the delivered powers usefulness in many applications. This is particularly true for delicate medical applications where uneven delivery of power may have a detrimental effect.

The above, and other objects, features and advantages of the present invitation will become apparent from the following description read in conjunction with the accompanying drawings, in which like reference numbers in different drawings denote like items.

DETAILED DESCRIPTION OF PREFERRED EMBODIMENTS

Figure 1:
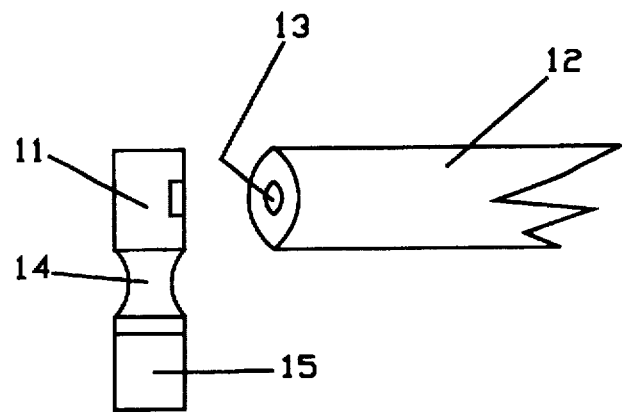
FIG. 1 depicts an embodiment where the laser is vibrated and the receiving fiber is fixed.

Referring to FIG. 1, ultrasonic transducer 15 vibrates laser 11 via mechanical connection 14. Optical fiber 12 has core 13 and is stationary. Core 13 receives laser 11's emissions varied by ultrasonic transducer 15's vibrations.

Figure 2:
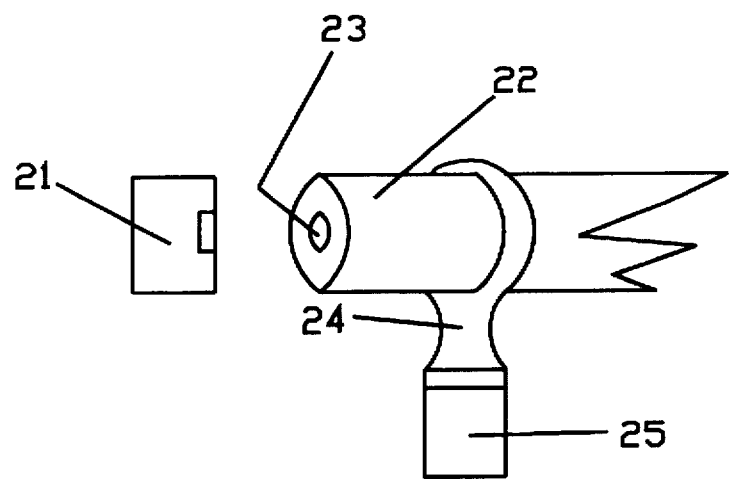
FIG. 2 depicts another embodiment where the optical fiber's receiving end is vibrated and the laser is fixed.

Referring to FIG. 2, ultrasonic transducer 25 vibrates optical fiber 22 and its core 23 via mechanical connection 24 while laser 21 is held stationary. Core 23 receives laser 21's emissions varied by ultrasonic transducer 25's vibrations.

Figure 3:
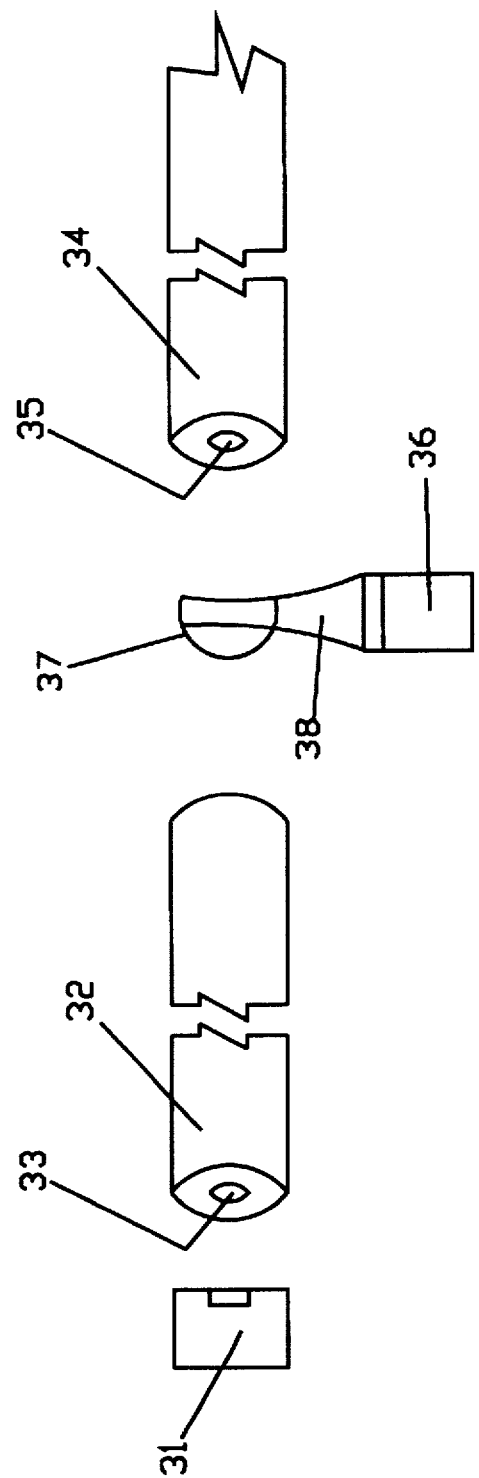
FIG. 3 depicts another embodiment where an optical element is being vibrated at an intermediate point along the beam's transmission path.

Referring to FIG. 3, laser 31, optical fibers 32 and 34, and cores 33 and 35 are held stationary. Along laser 31's transmission pith ultrasonic transducer 36 is coupled to lens 37 via mechanical connection 38. Core 35 receives laser 31's emissions varied by ultrasonic transducer 35's vibrations via lens 37 and mechanical connection 38.

Due to mechanical vibrations with the frequency 50–100 Hz with amplitude in the range of $\frac{1}{8}$ to 4 of fiber diameter, the speckle pattern rapidly moves across the fiber cross section resulting in time averaging of the beam power density. Under such vibrations the speckle patters can be observed only during the time intervals which are considerably shorter than the period of fiber vibration. In that case the power density threshold characterizing the maximum power density that can be transmitted through the fiber, depends on the time-averaged power density on the fiber end face rather than on maximal power density in speckle points inhomogeneously distributed over the fiber end face. This results in about 50% increasing of the maximal power transmitted by the fiber without its destruction.

If the frequency of vibration is lower then 50 Hz, then the time of destruction of the fiber end face is less than the period of vibration and the power density threshold is still given by the maximum power density in speckle points. In the case when the vibration frequency is larger than 1000 Hz and the amplitude is larger than 4 fiber diameters the life time of the waveguides is drastically reduced. The vibrations with the amplitude less than $\frac{1}{8}$ of fiber diameter is not sufficient for considerable averaging of the beam speckle pattern.

In one preferred embodiment when the input fiber end is vibrated, the amplitude of vibration should not exceed ½ of fiber diameter. Otherwise the fiber can not be effectively coupled with the input laser beam.

In one preferred embodiment a beam of $CO_2$ laser having the wavelength 10.6 μm has been used for fiber excitation. The light from the output fiber end is collected by a lens having focus distance of 4 cm The fiber of 1 mm diameter and 2–3 m long produced from a material which is a solid solution of 42% of thalium bromide and 58% of thalium iodide have been employed in the experiments. After appropriate mechanical and optical processing the fiber end faces were fixed.

EXAMPLE 1.

The laser beam is coupled into the fiber with the help of a lens. At the distance of 10 cm from the input fiber end an electromagnetic vibrator is connected to the fiber section having the length of 1 cm, which generates mechanical vibrations of the fiber with frequency 1000 Hz and amplitude 0.3 mm The beam outcoming from the output fiber end is collected by a lens. The power transmitted by the fiber, for as long as 4 hours, was equal to 30 W, while standard methods do not permit the transmission through such a fiber of a power larger than 20 W without its destruction.

EXAMPLE 2.

Laser beam was coupled into the fiber end face by a lens. At the distance of 50 cm from the input fiber end an electromagnetic vibrator is connected to the fiber section having the length of 1 cm, which generates mechanical vibrations of the fiber with frequency 100 Hz and amplitude 2 mm The beam outcoming from the output fiber end is collected by a lens. The power transmitted by the fiber, for as long as 4 hours, was equal to 30 W, while standard methods do not permit the transmission through such a fiber of a power larger than 20 W without its destruction.

EXAMPLE 3.

Laser beam was coupled into the fiber end face by a lens. A vibrator is connected to the input end of the fiber, which generates its mechanical vibrations with frequency 200 Hz and amplitude 0.5 mm The beam outcoming from the output fiber end is collected by a lens. The power transmitted by the fiber, for as long as 4 hours, was equal to 30 W, while standard methods do not permit the transmission through such a fiber of a power larger than 20 W without its destruction.

Thus, in these embodiments, the optical fiber delivery system of described in this invention provides a possibility of increasing in 1.5 times the power transmitted through the fiber without its destruction. This is very important gain for various medical, industrial and technological applications.

Having, described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed is:

1. A fiberoptic laser power delivery system, transmitting infrared energy in the 2.6 μm to 16 μm spectral region and having an enhanced laser power damage threshold, comprising:

a laser having emissions in the infrared range, 2.6 μm to 16 μm;

an infrared transmitting optical fiber, which is optically coupled to said laser;

said optical fiber having an input end face and an output end face;

means for essentially destroying a speckle pattern naturally occurring within said system by rapid motion of a selected component of said fiber optic delivery system thereby time averaging said laser's power upon exiting said output end face; and wherein said means for essentially destroying said naturally occurring speckle pattern is selected from a group consisting of at least one vibrating device which is mechanically coupled to an element of said delivery system, an acousto-optic modulator/deflector of a beam of said laser which is placed between said laser and said optical fiber, and an electro-optic modulator/deflector of a beam of said laser which is placed between said laser and said optical fiber.

2. A fiberoptic power delivery system according to claim 1, wherein said at least one vibrating device is the means chosen for essentially destroying said naturally occurring speckle pattern and wherein said laser is held stationary, said optical fiber is mechanically connected to said vibrating device, and said optical fiber is vibrated by said vibrating device so as to essentially destroy said naturally occurring speckle pattern.

3. A fiberoptic power delivery system according to claim 1, wherein said at least one vibrating device is the means chosen for essentially destroying said naturally occurring speckle pattern and wherein said optical fiber is held stationary, said laser is mechanically connected to said vibrating device, and said laser is vibrated by said vibrating device so as to essentially destroy said naturally occurring speckle pattern.

4. A fiberoptic power delivery system according to claim 1, wherein said at least one vibrating device is the means chosen for essentially destroying said naturally occurring speckle pattern and wherein said laser is held fixed, said optical fiber is held fixed, said laser's transmission path includes an additional optical element which is mechanically connected to said vibrating device, and said optical element is vibrated by said vibrating device so as to essentially destroy said naturally occurring speckle pattern.

* * * * *